No. 657,557. Patented Sept. 11, 1900.
P. MAEGAARD.
HARNESS SADDLE.
(Application filed Aug. 1, 1899.)
(No Model.)
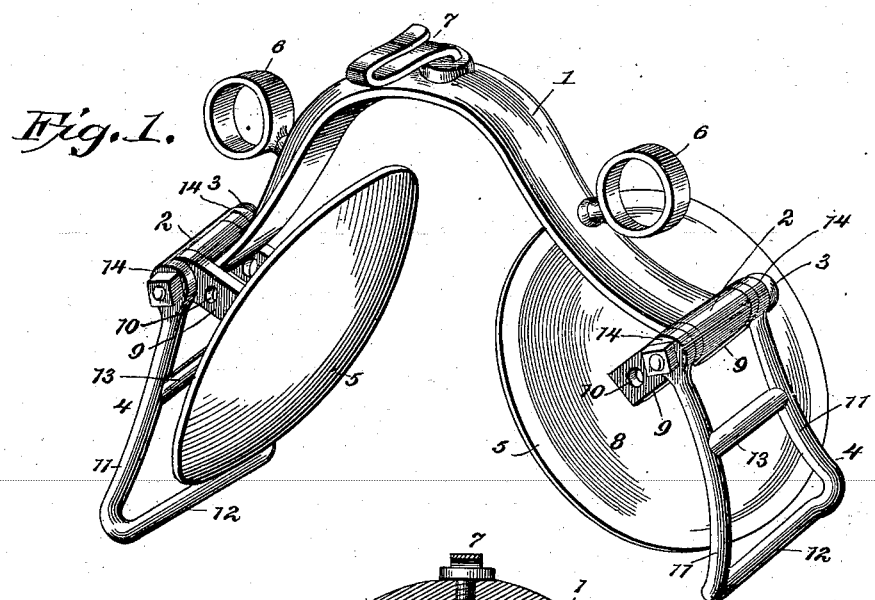
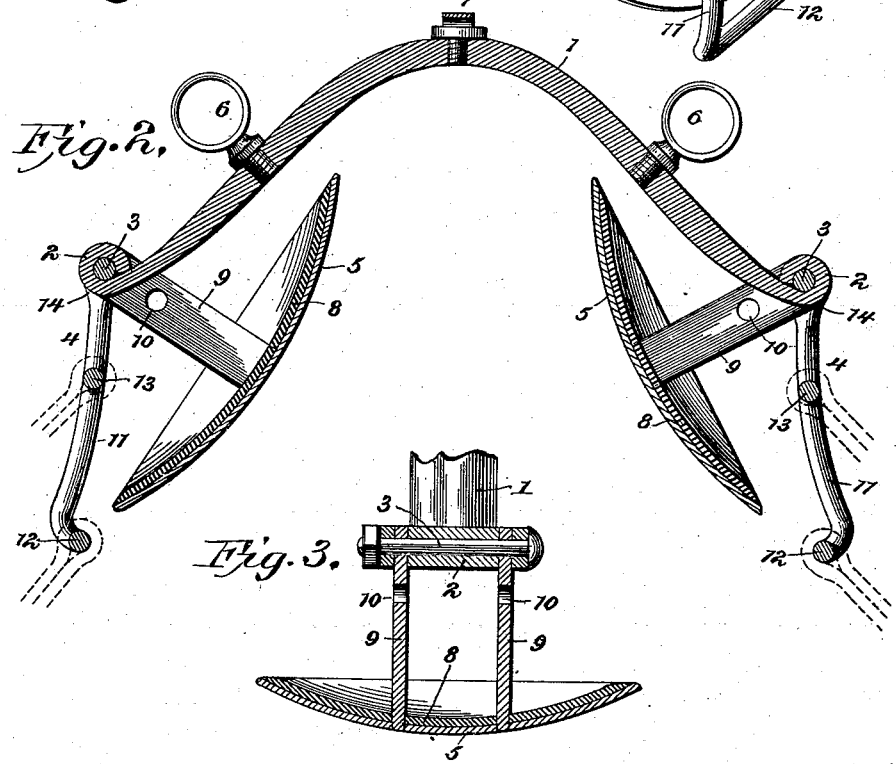
Witnesses
Howard D. Orr.
J. J. Riley
P. Maegaard, Inventor,
By his Attorneys,
C. A. Snow & Co.

UNITED STATES PATENT OFFICE.

PETER MAEGAARD, OF KENOSHA, WISCONSIN.

HARNESS-SADDLE.

SPECIFICATION forming part of Letters Patent No. 657,557, dated September 11, 1900.

Application filed August 1, 1899. Serial No. 725,799. (No model.)

*To all whom it may concern:*

Be it known that I, PETER MAEGAARD, a citizen of the United States, residing at Kenosha, in the county of Kenosha and State of Wisconsin, have invented a new and useful Harness-Saddle, of which the following is a specification.

The invention relates to improvements in harness-saddles.

One object of the present invention is to improve the construction of harness-saddles and to provide a simple and comparatively-inexpensive one adapted to readily adjust itself to the back of an animal and capable of yielding to horse motion and of preventing an animal from being injured by friction or rubbing of the saddle even when subjected to a heavy load.

A further object of the invention is to enable the saddle to be adjusted to suit large and small horses and to provide a metallic saddle which will not become heated by the sun sufficiently to annoy an animal.

The invention consists in the construction and novel combination and arrangement of parts hereinafter fully described, illustrated in the accompanying drawings, and pointed out in the claims hereto appended.

In the drawings, Figure 1 is a perspective view of a saddle constructed in accordance with this invention. Fig. 2 is a longitudinal sectional view. Fig. 3 is a transverse sectional view.

Like numerals of reference designate corresponding parts in all the figures of the drawings.

1 designates an arched bar forming the body portion of a saddle and adapted to extend transversely of the back of a horse or other animal and provided at its ends with eyes 2 for the reception of pivots 3, which connect links or frames 4 and plates or disks 5 to the body of the saddle. The body of the saddle, which arches the back of a horse or other draft-animal, is out of contact with the same and is provided with terret-rings 6 and a checkrein-hook 7, having threaded shanks which screw in threaded perforations of the bar 1.

The plates or disks 5, which are hingedly connected with the ends of the body portion of the saddle, are adapted to yield to the horse motion to avoid rubbing the back of an animal, and they are concavo-convex, as clearly illustrated in Fig. 2 of the drawings, and present convex lower or outer faces and are adapted to fit the back of a horse at opposite sides of the backbone. The bar 1 is constructed of metal, and the plates or disks, which are constructed of the same material, are provided at their outer concave faces with linings or coverings 8, of leather or other suitable material, which will prevent the plates or disks from becoming heated when exposed to the sun, whereby the metallic saddle will cause no annoyance or inconvenience to an animal.

The plates or disks 5 are provided with arms 9, arranged in pairs, as clearly shown in Fig. 3 of the drawings, and provided with perforations 10 for the reception of the pivots 3, which preferably consist of bolts and which are adapted to be arranged in either of the perforations shown to adjust the plates or disks to suit large and small draft-animals; but it will be readily apparent that more than two perforations may be provided in each of the arms, if desired.

The links or frames 4 are composed of sides 11 and connecting transverse portions 12 and 13, located at the outer ends of the sides and at a point near the centers thereof and adapted to receive, respectively, the girth or belly-band and the thill-tugs for the attachment of the shafts. The sides 11 are provided at their inner ends with eyes 14, arranged at the outer faces of the arms 9 and receiving the pivot-bolts 3, as clearly shown in Fig. 3. The links or frames, which are substantially rectangular, have their sides slightly bent at their outer ends, as shown in Figs. 1 and 2, and the joint between the body portion of the saddle and the links and the disks or plates permits the parts to yield readily to horse motion and effectually prevents the back of an animal from being rubbed and injured by the saddle. The links or frames are spaced from the plates or disks, and they extend downward beyond the lower edges of the same, as clearly shown in Fig. 2 of the drawings.

It will be seen that the saddle, which is metallic, possesses great strength and durability and that it is adapted to yield to horse motion, and thereby prevent the back of an animal from being rubbed and injured, and that the disks or plates are capable of adjustment to vary the distance between them and adapt the saddle for large and small animals. It will also be apparent that the plates or disks are prevented from becoming heated by the sun and that the pivot-bolts form a joint between each end of the body portion of the saddle and the adjacent disk or plate and the link or frame that will permit the parts to move freely and independently of one another.

Changes in the form, proportion, size, and the minor details of construction within the scope of the appended claims may be resorted to without departing from the spirit or sacrificing any of the advantages of this invention.

What is claimed is—

1. A device of the class described comprising the arched bar provided at its ends with eyes, the links extending downward from the ends of the arched bar, the concavo-convex plates located within the space inclosed by the arched bar and the links at points above the lower ends of the latter and provided with parallel arms arranged in pairs at opposite sides of the ends of the bar and extending upward at an inclination at right angles to the planes of the peripheries of the plates and provided at intervals with alined perforations, whereby the plates are adapted to be adjusted toward and from each other without moving them longitudinally of the links and the arched bar, and the transverse pivots passing through the perforations, the eyes and the links, said links being entirely separate from and adapted to move independently of the plates, substantially as described.

2. A device of the class described comprising a bar provided with eyes, the links extending downward from the ends of the bar and composed of sides provided at their upper ends with perforations, registering with the said eyes, said sides having diverging lower portions and inwardly-bent lower ends, the intermediate transverse connecting-pieces 13 extending across the links and connecting the sides between the ends thereof, and the lower transverse pieces 12 connecting the bent ends of the sides, the plates located within the space inclosed by the bar and the links, and arms connecting the plates with the links and the bar, said links being entirely separate from and adapted to move independently of the plates, substantially as described.

In testimony that I claim the foregoing as my own I have hereto affixed my signature in the presence of two witnesses.

PETER MAEGAARD.

Witnesses:
HENRY H. TIMME,
EDWARD L. ABEL.